US012151308B2

(12) United States Patent
Vierhout et al.

(10) Patent No.: US 12,151,308 B2
(45) Date of Patent: Nov. 26, 2024

(54) METHOD AND SYSTEM FOR COOLING A COMPONENT DURING LASER CLADDING

(71) Applicant: Collins Engine Nozzles, Inc., West Des Moines, IA (US)

(72) Inventors: Robert W. Vierhout, Cumming, IA (US); Troy Finton, Phoenix, AZ (US)

(73) Assignee: Collins Engine Nozzles, Inc., Des Moines, IA (US)

( * ) Notice: Subject to any disclaimer, the term of this patent is extended or adjusted under 35 U.S.C. 154(b) by 600 days.

(21) Appl. No.: 16/427,075

(22) Filed: May 30, 2019

(65) Prior Publication Data
US 2020/0376599 A1   Dec. 3, 2020

(51) Int. Cl.
*B23K 26/34* (2014.01)
*B23K 26/08* (2014.01)
(Continued)

(52) U.S. Cl.
CPC .......... *B23K 26/34* (2013.01); *B23K 26/0869* (2013.01); *B23K 26/144* (2015.10); *B23K 26/1476* (2013.01); *B23K 26/703* (2015.10)

(58) Field of Classification Search
CPC ............ B23K 2101/34; B23K 26/0869; B23K 26/144; B23K 26/1476; B23K 26/34; B23K 26/342; B23K 26/703; B23K 26/08; B23K 26/14; B23K 20/00; B23K 31/02; B23K 37/003; B23K 2101/001; B23K 2103/08; B23K 2103/26; B23K 37/00; B23K 26/70; C10J 3/72; F28F 9/0075; F28F 2013/006; F28F 27/00; F28F 13/00; F28F 3/02; B23P 6/002; B23P 15/26; F01D 5/286; F01D 5/28; Y10T 29/4935; Y10T 165/133;
(Continued)

(56) References Cited

U.S. PATENT DOCUMENTS 7,520,745 B2 * 4/2009 Oomens .................. F23C 7/002
431/350
2012/0230781 A1 * 9/2012 Hoffer ................ B23Q 11/1023
407/11
(Continued)

FOREIGN PATENT DOCUMENTS

DE   102014209847 A1   11/2015
EP   3248718 A1 * 11/2017 ............. B33Y 10/00

OTHER PUBLICATIONS

Extended European Search Report dated Jul. 17, 2020, issued during the prosecution of European Patent Application No. 19212779.3.

*Primary Examiner* — Dana Ross
*Assistant Examiner* — Adam M Eckardt
(74) *Attorney, Agent, or Firm* — Bachman & LaPointe, P.C.

(57) ABSTRACT

A method of cooling a component during laser cladding can include attaching a flow adapter to the component, flowing cooling fluid through the flow adapter, flowing the cooling fluid through the component during laser cladding. Attaching a flow adapter to the component can fluidly communicate at least one adapter channel to one or more component channels, and flowing cooling fluid through the at least one adapter channel can pass cooling fluid through the one or more component channels to cool the component during laser cladding. The method can include laser cladding the component.

22 Claims, 1 Drawing Sheet

(51) Int. Cl.
*B23K 26/14* (2014.01)
*B23K 26/144* (2014.01)
*B23K 26/70* (2014.01)

(58) Field of Classification Search
CPC ...... Y10T 165/287; B22F 10/10; B22F 10/20; B22F 10/30; B22F 2999/00; B22F 12/00; B22F 2203/03; B22F 2203/11; B22F 10/25; B22F 12/20; B22F 12/53; B22F 3/105; B22F 3/16; B29C 64/153; B29C 64/245; B29C 64/268; B29C 64/393; B29C 65/18; B29C 66/81; B29C 67/00; B29C 43/04; B33Y 10/00; B33Y 30/00; B33Y 50/02

See application file for complete search history.

(56) References Cited

U.S. PATENT DOCUMENTS

| | | | |
|---|---|---|---|
| 2014/0262198 A1* | 9/2014 | Bruck | B23K 37/003 |
| | | | 165/287 |
| 2017/0114466 A1* | 4/2017 | Levy | C23C 24/04 |

* cited by examiner

METHOD AND SYSTEM FOR COOLING A COMPONENT DURING LASER CLADDING

BACKGROUND

1. Field

This disclosure relates to liquation cracking prevention, for example.

2. Description of Related Art

Laser cladding can be used for adding material to the surface of a component in a controlled environment, e.g., to restore components to a serviceable condition after material has been worn away in the service environment. For example, laser cladding can restore surface dimensions on worn parts. Laser cladding can save time and cost by repairing, e.g., used fuel nozzle components instead of replacing entire assemblies.

Certain alloys are sensitive to heat-affected zone (HAZ) liquation cracking during the cladding process. Mechanical heat sinks (e.g., a solid copper block) can be utilized on a basic design to dissipate heat and mitigate HAZ liquation cracking. On complex designs, however, the use of heat sinks is not feasible.

Such conventional methods and systems have generally been considered satisfactory for their intended purpose. However, there is still a need in the art for improved liquation cracking prevention. The present disclosure provides a solution for this need.

SUMMARY

A method of cooling a component during laser cladding can include attaching a flow adapter to the component, flowing cooling fluid through the flow adapter, flowing the cooling fluid through the component during laser cladding. Attaching a flow adapter to the component can fluidly communicate at least one adapter channel to one or more component channels, and flowing cooling fluid through the at least one adapter channel can pass cooling fluid through the one or more component channels to cool the component during laser cladding. The method can include laser cladding the component.

Flowing cooling fluid can include flowing compressed air. Flowing cooling fluid can include removing heat such that liquation cracking is prevented.

Attaching the flow adapter can include sealing at least a portion of the flow adapter to the component using a seal attached to the flow adapter. The flow adapter can include a complementary shape to the component, for example.

Flowing cooling fluid can include flowing cooling fluid through a plurality of openings in the flow adapter and into the one or more component channels. The component can include a fuel nozzle swirler assembly, for example, or any other suitable component.

In accordance with at least one aspect of this disclosure, a flow adapter can be sized and configured to attach to a cooling fluid source and to a component such that a cooling fluid supplied to the flow adapter flows through the flow adapter and through the component while the component is being laser clad. The flow adapter for attaching to a component during a laser cladding process can include a body defining at least one adapter channel configured to be in fluid communication with one or more component channels of the component when attached to the component. The body can be configured to connect to a cooling fluid source.

In certain embodiments, the body can include a complementary shape to the component. The component can include a fuel nozzle swirler assembly, for example. The body can define a neck for extending into a central channel of the swirler assembly. The body can define a conic face complementary to a shape of the swirler assembly for receiving and contacting an outer shield of the swirler assembly.

The at least one adapter channel can be an axially defined channel extending partially into the body. The neck can include a plurality of radial openings defined therethrough and positioned to allow fluid communication between the at least one adapter channel and the one or more component channels.

A seal channel can be defined in the neck and be configured to receive a seal. The adapter can include a seal disposed in the seal channel and around the neck for sealing the adapter to the swirler assembly. The plurality of radial openings can be disposed between the seal channel and the conic face such that when the adapter is pressed into the swirler assembly and abutting the conic face, the radial holes fluidly communicate the at least one adapter channel and the one or more component channels.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
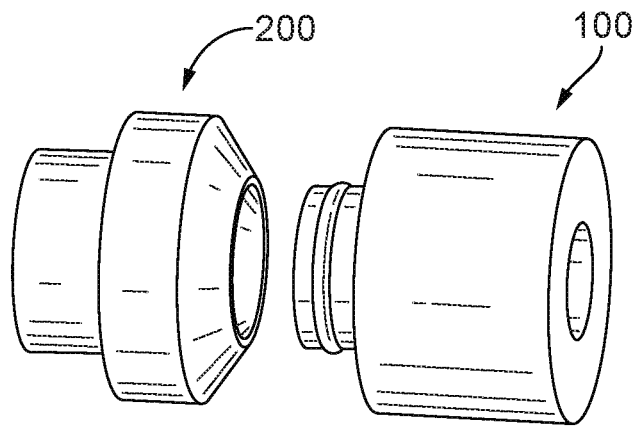
FIG. 1 is a perspective view of an embodiment of a flow adapter and a component in accordance with this disclosure.

Reference will now be made to the drawings wherein like reference numerals identify similar structural features or aspects of the subject disclosure. For purposes of explanation and illustration, and not limitation, an illustrative view of an embodiment of an adapter in accordance with the disclosure is shown in FIG. 1 and is designated generally by reference character 100. Other embodiments and/or aspects of this disclosure are shown in FIG. 2.

Figure 2:
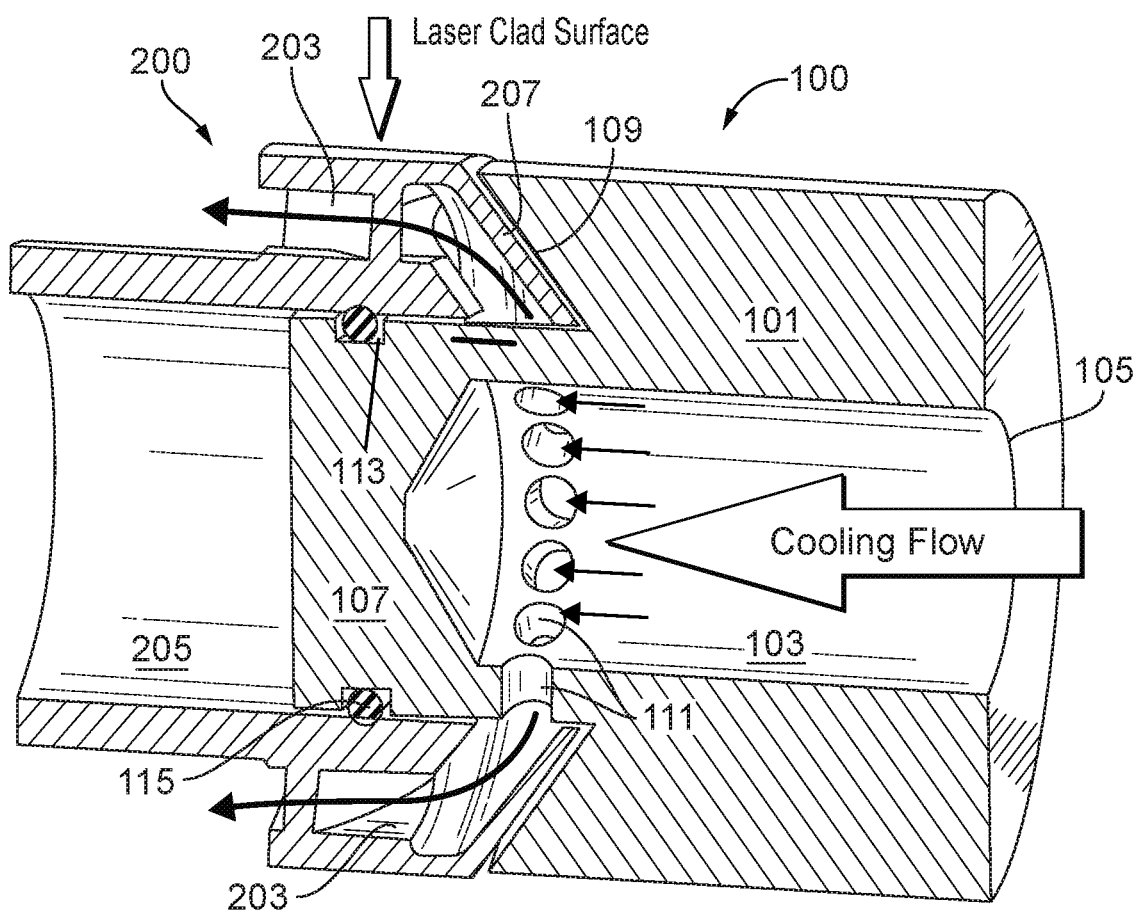
FIG. 2 is a perspective cross-sectional view of the embodiment of FIG. 1, showing the adapter connected to the component and cooling fluid being passed therethrough while laser cladding.

Referring to FIGS. 1 and 2, a flow adapter 100 can be sized and configured to attach to a cooling fluid source and to a component 200 such that a cooling fluid supplied to the flow adapter 100 flows through the flow adapter 100 and through the component 200 while the component 200 is being laser clad. The flow adapter 100 for attaching to a component 200 during a laser cladding process can include a body 101 defining at least one adapter channel 103 configured to be in fluid communication with one or more component channels 203 of the component 200 when attached to the component 200. The body 101 can be configured to connect to a cooling fluid source (e.g., a compressed air source). For example, the body 101 can include any suitable outer shape (e.g., cylindrical) or fitting (e.g., threading, snaps, etc.) for connecting to a cooling fluid source.

The body 101 can include an opening 105 defined by the at least one adapter channel 103 configured to communicate with the cooling fluid source. The opening can include any suitable features to connect to the cooling fluid source.

In certain embodiments, the body 101 can include a complementary shape to the component (e.g., to flushly mate to the component as shown). For example, in certain embodiments, the component 200 can include a fuel nozzle swirler assembly as shown, and the body 101 can include an inverse shape for flushly contacting the swirler assembly. Any other non-complementary shape is contemplated herein.

The body 101 can define a neck 107 for extending into a central channel 205 of the component 200 (e.g., swirler assembly). The neck 107 can extend axially from the body 107 any suitable length. The body 101 can define a conic face 109 complementary to a shape of the component 200 (e.g., swirler assembly) for receiving and contacting an outer shield 207 of the component 200 (e.g., swirler assembly).

The at least one adapter channel 103 can be an axially defined channel extending partially into the body 101, e.g., as shown. The neck 107 can include a plurality of radial openings 111 defined therethrough and positioned to allow fluid communication between the at least one adapter channel 103 and the one or more component channels 203.

In certain embodiments, a seal channel 113 can be defined in the neck 107 and be configured to receive a seal 115. The adapter 100 can include the seal 115 disposed in the seal channel 113 and around the neck 107 for sealing the adapter 100 to the component 200. Any number of seals to control flow through the component and adapter (e.g., to prevent fluid from leaking to, e.g., argon environment around clad area used in cladding).

The plurality of radial openings 111 can be disposed between the seal channel 113 and the conic face 109 such that when the adapter 100 is pressed into the component 200 and abutting the conic face 109, the radial holes 111 fluidly communicate the at least one adapter channel 103 and the one or more component channels 203. Any other suitable position for the radial holes 111 is contemplated herein.

The adapter 100 can be made from metal, plastic, or ceramic in certain embodiments. Any other suitable material is contemplated herein. The adapter 100 can be made in any suitable way (e.g., via additive manufacturing).

Any other suitable shape for the adapter 100 to fit with any other suitable component is contemplated herein. Any other suitable adapter channel(s) 103 and/or inlet(s) and/or outlet(s) therefor are contemplated herein. A system for cooling a component during a laser cladding process can include any suitable embodiment of a flow adapter disclosed herein.

A method for providing cooling to a component (e.g., component 200) during laser cladding can include attaching a flow adapter (e.g., adapter 100) to the component (e.g., to fluidly communicate at least one adapter channel to one or more component channels), and flowing cooling fluid (e.g., as shown in FIG. 2) through the flow adapter (e.g., through the at least one adapter channel to pass cooling fluid through the one or more component channels) to cool the component during laser cladding. The method can include flowing the cooling fluid through the component during laser cladding. The methods can include laser cladding the component, e.g., as shown in FIG. 2.

Flowing cooling fluid can include flowing compressed air. Flowing cooling fluid can include removing heat such that liquation cracking is prevented.

Attaching the flow adapter can include sealing at least a portion of the flow adapter to the component using a seal attached to the flow adapter. The flow adapter can include a complementary shape to the component, for example.

Flowing cooling fluid can include flowing cooling fluid through a plurality of openings in the flow adapter and into the one or more component channels. The component can include a fuel nozzle swirler assembly, for example, or any other suitable component. The cooling fluid can be or include, air, argon, helium, or any other suitable fluid.

In certain embodiments, during the cladding process an adapter can be attached to a fuel nozzle swirler assembly tip and to a compressed air source. The adapter can direct the air through the fuel nozzle swirler vanes directly below the air cap, for example. The compressed air can come directly from a shop-air source or utilize the benefits of colder air from a Ranque-Hilsch vortex tube, for example. Any other suitable cooling fluid is contemplated. The air flows through the vanes during the cladding process to dissipate the heat built up while the laser is cladding the outer air cap of the nozzle swirler assembly.

Use of an embodiment of an adapter to direct chilled air through a complex swirler vanes has been demonstrated to eliminate HAZ liquation cracking where heat sinks were not feasible and metallurgically, the underlying base metal showed a propensity to crack. The combination of the adapter interfacing with the component and a chilled cooling fluid act in several beneficial ways to mitigate cracking. For example, the fluid can replace the solid heat sink to provide a cooling mechanism for the underlying base material creating a steep temperature gradient and rapid cooling. The structure of the component in concert with the chilled fluid can work similar to cooling fins providing additional heat sinking, for example. The steep temperature gradient and rapid cooling can act to minimize the physical HAZ size and "time-at-temperature" mechanism thought to drive cracking susceptibility in alloys sensitive to this type of cracking.

Embodiments can produce a component having a clad section free of voids or cracking. Embodiments utilize a cooling fluid below the area being cladded to which draws away heat rapidly, shortening the cooling time of the clad and eliminating the liquation cracking caused by a slow cool rate.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

Any suitable combination(s) of any disclosed embodiments and/or any suitable portion(s) thereof are contemplated herein as appreciated by those having ordinary skill in the art.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A method of cooling a component during laser cladding, comprising:
   providing the component, the component having one or more component channels;
   attaching a flow adapter to the component, the flow adapter having at least one adapter channel; and
   flowing a cooling fluid through the flow adapter;
   laser cladding a cladding surface of the component; and
   flowing the cooling fluid through the component during laser cladding,
   wherein:
      the attaching the flow adapter to the component includes fluidly communicating the at least one adapter channel to the one or more component channels; and
      the flowing the cooling fluid through the at least one adapter channel passes the cooling fluid through the one or more component channels and along a radially inner face of the cladding surface of the component to cool the cladding surface and the component during laser cladding.

2. The method of claim 1, wherein the cooling fluid is or includes compressed air.

3. The method of claim 1, wherein the flowing the cooling fluid includes removing heat such that liquation cracking is prevented.

4. The method of claim 1, wherein the attaching the flow adapter to the component includes sealing at least a portion of the flow adapter to the component using a seal attached to the flow adapter.

5. The method of claim 1, wherein the flow adapter includes a complementary shape to the component.

6. The method of claim 1, wherein the flowing the cooling fluid includes flowing cooling fluid through a plurality of openings in the flow adapter and into the one or more component channels.

7. The method of claim 5, wherein the component is a fuel nozzle swirler assembly.

8. A system for cooling a component during a laser cladding process of a cladding surface of the component comprising:
   a flow adapter sized and configured to attach to a cooling fluid source and to the component such that a cooling fluid supplied to the flow adapter flows through at least one adapter channel of the flow adapter and through one or more component channels of the component while the component is being laser clad,
   wherein:
      the at least one adapter channel is an axially defined channel extending partially into the body; and
      the flow adapter further includes a plurality of radial openings defined therethrough and positioned to allow fluid communication between the at least one adapter channel and the one or more component channels such that the cooling fluid flows through the one or more component channels and along a radially inner face of cladding surface of the component to cool the cladding surface and the component during laser cladding.

9. The system of claim 8, wherein the flow adapter includes a body defining at least one adapter channel configured to be in fluid communication with one or more component channels of the component when attached to the component, wherein the body is configured to connect to the cooling fluid source.

10. The system of claim 9, wherein the body includes a complementary shape to the component.

11. The system of claim 9, wherein the component is a fuel nozzle swirler assembly.

12. The system of claim 11, wherein the body defines a neck for extending into a central channel of the fuel nozzle swirler assembly.

13. The system of claim 12, wherein the body defines a conic face complementary to a shape of the fuel nozzle swirler assembly for receiving and contacting an outer shield of the fuel nozzle swirler assembly.

14. The system of claim 12, wherein the plurality of radial openings are defined in the neck.

15. The system of claim 14, further comprising a seal channel defined in the neck configured to receive a seal.

16. The system of claim 15, further comprising the seal disposed in the seal channel and around the neck for sealing the flow adapter to the fuel nozzle swirler assembly.

17. The system of claim 16, wherein the plurality of radial openings are disposed between the seal channel and the conic face such that when the flow adapter is pressed into the fuel nozzle swirler assembly and abutting the conic face, the radial holes fluidly communicate the at least one adapter channel and the one or more component channels.

18. A method for repairing a swirler, the swirler comprising a metallic body having:
   an inner section surrounding a central channel;
   an outer shield having an outer surface from which material has been worn;
   one or more channels between the inner section and the outer shield
the method comprising:
   attaching a flow adapter to the swirler; and
   laser cladding the outer shield outer surface; and
   during said laser cladding flowing a cooling fluid through the flow adapter and, therefrom, through the one or more channels.

19. The method of claim 18 wherein:
   the attaching comprises inserting a portion of the flow adapter into the inner section to seal therewith.

20. The method of claim 18 wherein:
   the flowing comprises passing the cooling fluid out through a plurality of outlet openings of the flow adapter inserting a portion of the flow adapter into the inner section to seal therewith.

21. The method of claim 18 wherein:
   the flowing comprises passing the cooling fluid radially outward from the flow adapter inserting a portion of the flow adapter into the inner section to seal therewith.

22. The method of claim 18 wherein:
   the flowing comprises passing the cooling fluid in through a first opening of the flow adapter.

* * * * *